United States Patent Office 2,847,409
Patented Aug. 12, 1958

2,847,409

UNSATURATED AMINOSILANES, POLYMERS THEREOF AND METHODS OF MAKING THEM

Peter L. de Benneville, Philadelphia, and Marvin J. Hurwitz, Elkins Park, Pa., assignors to Rohm & Haas Company, Philadelphia, Pa., a corporation of Delaware No Drawing. Application May 12, 1955
Serial No. 507,972

17 Claims. (Cl. 260—89.7)

This invention concerns novel unsaturated substituted aminosilanes which are adapted to be polymerized by addition polymerization or, in some instances, either by condensation or addition polymerization systems.

It is an object of the present invention to provide novel polymerizable vinyl ethers of aliphatic hydrocarbon aminosilanes, some of which are adapted to produce linear polymers having a carbon-to-carbon linkage in the backbone of the polymer and containing silicon in the side branches thereof, and others of which are adapted to produce three-dimensional polymers. Other objects and advantages of the invention will be apparent from the description hereinafter.

The monomeric compounds of the present invention have the structure of Formula I following:

I
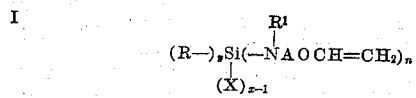

where $n$ is a number having a value of 1 to 2, preferably being 1, $x$ is a number having a value of 1 to 2, preferably being 1, $y$ is equal to $5-x-n$, R is an alkyl or aryl group, such as phenyl, preferably being a lower alkyl of 1 to 4 carbons, R′ is hydrogen or an alkyl group having 1 to 18 carbon atoms, A is a cyclohexylene group or an alkylene group having 2 to 10 carbon atoms, at least two thereof extending in a chain between the adjacent nitrogen and oxygen atoms, preferably being an alkylene group having 2 to 4 carbon atoms, and X is Cl, —NR²R³, or —OR⁴ wherein R² and R³ are each selected individually from hydrogen and alkyl groups such that the total of carbon atoms in R² and R³ is from zero to 4 or R² and R³ together may be the morpholino residue =(C₂H₄)₂O, the piperidino residue —C₅H₁₀— or the pyrrolidino residue —C₄H₈—, and R⁴ is an alkyl group having 1 to 4 carbon atoms.

A preferred group has the structure of Formula II:

II           (R)₃SiN(R′)AOCH=CH₂ the symbols having the same definition as above.

The monomeric compounds may generally be produced by the reaction of a compound having the strcture of Formula III following with any one of several types of compounds having the structures of Formulas IV, V, and VI following respectively:

III           CH₂=CHOANHR′
IV            (R)$_y$Si(Cl)$_{4-y}$
V             (R)$_y$Si(—NR²R³)$_{4-y}$
VI            (R)$_y$Si(—OR⁴)$_{4-y}$ where the symbols have the same definitions as above.

The preparation of the monomeric compounds by the reaction of compounds of Formulas III and IV respectively may be carried out in an anhydrous solvent, such as benzene, toluene, xylenes or tertiary amines, such as trimethylamine, triethylamine, pyridine, quinoline and the like generally at a temperature of about −20° C. to room temperature, preferably between −5° C. and +10° C.

However, higher temperatures up to 100° C. are useful when R is aryl and the A or R′ is of a character imparting steric hindrance to the nitrogen of Formula III. The reaction, when R is alkyl or when R is phenyl and the nitrogen of III is not sterically hindered, is rapid and exothermic and, therefore, it is preferred to add one of the reactants to a solution of the other in benzene, at a temperature below room temperature, such as at −5° C. to +10° C., at a rate that is sufficiently slow to enable proper control of the temperature by cooling means. Generally, in these cases, reaction is complete at the end of the addition of one reactant to the other. The reaction must be effected in the presence of a tertiary amine to take up the hydrogen chloride liberated. By proceeding in this manner, the maxilmum yield is obtained and there is a minimum formation of by-products resulting from the action of hydrogen chloride on the compound of Formula III. Sufficient tertiary amine should be added to take up all of the hydrogen chloride liberated and preferably an excess over this amount is used.

A preferred manner of preparing the monomeric compounds of the present invention is that which involves the reaction of compounds having the Formulas of III and V respectively. In this reaction, no solvent is needed and it is effected merely by heating. A free amine is liberated by the condensation of the silyl amine of Formula V with the amino compound of Formula III. The temperature may be varied depending upon the boiling point of the amine liberated (NHR²R³), and when a high boiling amine is used which would require temperatures above about 100° C. to effect distillation, it is preferable to employ a vacuum to enable a lower temperature to be maintained in the reaction system. The distillation of the amine formed on condensation leaves the desired product substantially free of impurities. No special step or steps for separating or purifying the product of Formula I is required.

A third method of making the compounds is to react compounds of Formulas III and VI together. Condensation of these two types of compounds liberates a free alcohol having the formula R⁴OH. As in the preceding method, no solvent need be used. The reactants are simply mixed and heated to reflux with simultaneous liberation of the alcohol. Whereas the preceding method in which an amine is liberated requires a short time on the order of one-half an hour to an hour or so, this method in which an alcohol is liberated is considerably slower requiring a time which may vary from 4 to 24 hours or more. Again, the temperature may vary from about 100° C. down to 50° to 60° C. depending on the particular alcohol liberated and whether vacuum is employed.

The aminosilanes of the present invention which have the structures of Formulas I or II are generally liquid or solid, are insoluble in water, but are soluble in polar and non-polar organic solvents, such as benzene, toluene, acetone, dioxane, acetonitrile, dimethylformamide, and dimethylacetamide. They may be incorporated in melts or solutions of film-forming materials to impart modified dye-receptivity to fibers, films, or other shaped articles formed therefrom. For this purpose, 1 to 7% on the weight of the film-forming material, may be employed, and they are especially useful in modifying film-forming materials comprising polymers of acrylonitrile containing at least 80% of acrylonitrile including copolymers thereof with vinyl chloride, vinyl acetate, vinyl pyridines as well as blends of such polymers.

The monomers thus produced may be polymerized either in bulk (when they are liquid or low-melting solids), or in solution, such as in benzene, toluene, xylenes, solvent naphthas, acetone, dioxane, acetonitrile, dimethylformamide or dimethylacetamide. The temperature of polymerization may be from about 45° C. to 100° C. or higher. The polymerization may be accelerated by free radical initiators such as benzoyl peroxide, acetyl peroxide, lauryl peroxide, cumene hydroperoxide, or preferably those of the azo type such as azoisobutyronitrile and the esters and amides of azoisobutyric acid such as the methyl, ethyl, isoprpoyl or butyl esters and the simple amides or N-substituted amides including the N-methyl amide. The time of polymerization may vary from 2 to 24 hours.

The compounds may be homopolymerized by these methods or copolymerized thereby. Examples of co-monomers that may be polymerized with the unsaturated silanes of the present invention include acrylonitrile, vinyl chloride, vinylidene chloride, tetrafluoroethylene, the vinyl aromatic compounds, more particularly the vinyl aromatic hydrocarbons (e. g., styrene, isopropenyl toluene, vinyl toluene, the various dialkyl styrenes, etc.), other aliphatic compounds containing a $CH_2=C<$ grouping, e. g. the various substituted acrylonitriles (e. g., methacrylonitrile, ethacrylonitrile, phenylacrylonitrile, etc.), acrylamide and the various substituted acrylamides (e. g. methacrylamide, ethacrylamide, the various N-substituted acrylamides which are different from those used in practicing the present invention and the various N-substituted alkacrylamides, for instance N-methylol acrylamide, N-monoalkyl and -dialkyl acrylamides and methacrylamides, e. g. N-monomethyl, -ethyl, -propyl, -buytl, etc. and N-dimethyl, -ethyl, -propyl, -butyl, etc., acrylamides and methacrylamides, N-monoaryl and -diaryl acrylamides and alkacrylamides, e. g. N-monophenyl and -diphenyl acrylamides and methacrylamides, etc.), vinyl esters, e. g. vinyl acetate, vinyl propionate, vinyl butyrate, vinyl isobutyrate, vinyl valerate, etc., esters of an acrylic acid (including acrylic acid itself and the various alpha-substituted acrylic acids, e. g. methacrylic acid, ethacrylic acid, phenylacrylic acid, etc.), more particularly the alkyl esters of an acrylic acid, e. g., the ethyl, propyl, isopropyl, n-butyl, isobutyl, sec-butyl, tert-butyl, amyl, hexyl, heptyl, octyl, decyl, dodecyl, hexadecyl, octadecyl, etc. esters of acrylic, methacrylic, ethacrylic, phenylacrylic, etc. acids, vinyl ethers, such as butyl vinyl ether, N-vinyl compounds such as N-vinyl pyrrolidone, and olefins, such as ethylene, fluorinated vinyl compounds, such as vinylidene fluoride, as well as other vinyl aromatic and vinyl aliphatic compounds, and other compounds containing a single $CH_2=C<$ grouping.

The preferred compounds of Formula II are mono-ethylenically unsaturated so that linear addition polymers are obtained from them. When monomers of Formula I having $n$ greater than 1, e. g. equal to 2, are polymerized by the addition system, complex, three-dimensional polymers are obtained. The presence of a small amount of monomer having $n$ equal to 2, such as 2 to 5% thereof, in a large amount, such as 95 to 98%, of a monoethylenically unsaturated compound of Formula I wherein $n$ equals 1, produces cross-linked polymers.

The linear polymers obtained may be viscous liquids to resinous solids which are permanently thermoplastic in character by virtue of the linear backbone of carbon-to-carbon bonds. These linear polymers and copolymers are extremely flexible and tough, which property seems to be attributable to the alkoxy linkage between the backbone of the polymer and the silicon-containing terminus of the branch chains in the polymer. The three-dimensional and cross-linked polymers are of non-thermoplastic, insoluble character and may be formed into molded masses, ion-exchange resins, and so on by completion of the polymerization in the mold.

The solid linear polymers may be formed into films, sheets, rods, and tubes by conventional molding operations either involving the casting of solutions or the extruding or otherwise forming of either solutions or melts of the polymers. The solid polymers, both linear and non-linear, are characterized by a relatively low degree of tackiness as compared to similar polymers containing no silicon. By virtue of this character they have a correspondingly reduced tendency to adhere to heated objects used in their formation, such as heated molds or drying, calendering or other heated rolls, cylinders, and so forth, especially when these objects are formed of such materials as stainless steel, aluminum or Monel metal. The viscous liquid polymers and copolymers of linear type are useful as hydraulic transmission media such as in hydraulic power systems including hydraulic lifts and brakes. They are also useful as lubricants or as lubricant-additives. For example 5% to 25% by weight of a linear homoploymer or copolymer of the new monomers with such higher alkyl methacrylates as lauryl, cetyl or stearyl methacrylates may be incorporated into neutral mineral oil to improve the viscosity index. The presence of the terminal silicon-containing groups in the copolymers apparently accounts for the improved temperature-viscosity relationship. The resinous solid polymers and copolymers of linear type may be used for forming all sorts of coatings for wood, textile fabrics, paper, leather or the like. When so used, they may be pigmented or provided with fillers or delusterants. The thermoplastic nature of the solid linear polymers of the present invention makes them useful as binders which are adapted to be rendered thermoplastic on heating. For this purpose, they are particularly useful for adhering glass fibers or plates together. The monomeric compounds of Formula I in which $n$ is greater than 1 may be applied with a polymerization catalyst as coatings or impregnants to wood, glass fibers or plates, textiles, leather, paper, felts, or the like, with or without pigments, fillers, delustrants or the like, and then converted to infusible form by heating or prolonged storage at normal room temperatures. For example, an unsaturated monomeric compound of the invention, such as

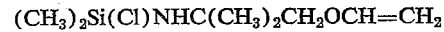
$(CH_3)_2Si(Cl)NHC(CH_3)_2CH_2OCH=CH_2$ may be polymerized in bulk in the presence of an azo catalyst, such as diethyl azodiisobutyrate, at a temperature of say 75° C. for 24 hours to produce a viscous oily polymer which may be dissolved in a solvent, such as acetone or dioxane and sprayed on a substrate, such as a masonry wall of stone, brick, concrete, stucco, asbestos, or the like, and allowed to dry and cross-link merely by exposure to atmospheric moisture to form a non-dusting, hydrophobic coating on the masonry substrate.

In the following examples, which are illustrative of the present invention, the parts given are by weight unless otherwise noted:

*Example 1*

A mixture of 25 parts of N-methylaminoethyl vinyl ether and 36 parts of N-t-butylaminotrimethylsilane is heated in a carefully dried system under partial reflux at temperatures ranging from 80° C. at the start to 140° C. at the end. During this period, there slowly distills over t-butylamine, boiling for the most part at 50–55° C. Distillation is completed in about 3 hours. After no more amine distills, the pot is cooled and the product is distilled under 12 mm. of mercury. After discarding a fore-run, there is obtained as a colorless liquid, N-trimethylsilyl-N-methyl-2-aminoethyl vinyl ether, boiling at 56°–58° at this pressure, and containing by analysis 8.1% total nitrogen.

*Example 2*

A mixture of 131 parts of 2-aminoethyl vinyl ether and 196 parts of t-butylaminotrimethylsilane is heated in a carefully dried flask fitted with an 8-inch Vigreux column and reflux head to a temperature of 80° C. until t-butylamine begins to distill. Distillation is continued, the temperature of the mixture slowly rising until at the end it is 130° C. At this time, after about 1.5 hours of distillation, there is practically no distillate being obtained. The mixture is cooled, placed under a vacuum of 12 mm. of mercury and carefully distilled. A small fore-run of unreacted 2-aminoethyl vinyl ether is discarded and the product, N-trimethylsilyl-2-aminoethyl vinyl ether, is collected as a colorless liquid boiling at 49° to 53° C. at this pressure. This material has a neutral equivalent by titration with 0.1 N hydrochloric acid of 163.

Example 3

To a mixture of 28.8 parts of β-aminoisobutyl vinyl ether, 50.6 parts of triethylamine and 90 parts of benzene, is added dropwise a mixture of 27.2 parts of trimethyl chlorosilane and 90 parts of benzene while the temperature is maintained at 0° to 5° C. The mixture is filtered and the filtrate distilled to yield 30.9 parts (a 66% yield) of product, β-vinyloxy-t-butylaminotrimethylsilane, B. P. 77° C./24, 68° C./15 mm. Hg; percent C found, 57.5; theory, 57.8. Percent H found, 11.1: theory, 11.3. Percent N found, 7.7; theory, 7.5. Neutralization equivalent found, 187.2; theory, 187.4.

Example 4

To a stirred mixture of 58 parts of β-aminoisobutyl vinyl ether and 60 parts of triethylamine in 800 parts of dry benzene maintained at 0° to 5° C., there is added slowly 253 parts of diphenyldichlorosilane in 300 parts of dry benzene. After addition is completed, stirring is continued for two hours. The reaction mixture is then filtered and the filtrate is concentrated to leave 160 parts of a viscous oil having substantially the composition of diphenylchlorosilyl-2-aminoisobutyl vinyl ether,

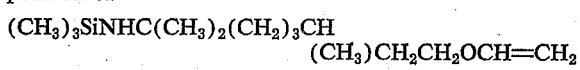

Twenty parts of the monomeric product is dissolved in toluene and 6 parts of diethyl azodiisobutyronitrile is added. The mixture is heated to 75° C. for 24 hours. The reaction mixture is then sprayed on a stucco wall where cross-linking occurs in the presence of atmospheric moisture, leaving a substantially nondusting hydrophobic protective coating thereon.

Example 5

A mixture of 202 parts of di-t-butylaminodimethylsilane and 87 parts of β-aminoethyl vinyl ether is heated at 120° C. for about one hour at which time 65 parts of t-butylamine is removed by distillation. A mixture of bis(β-vinoxyethylamino)dimethylsilane and β-vinoxyethylamino-t-butylaminodimethylsilane is obtained which are separated by distillation.

Example 6

A mixture of 272 parts of diethylaminotributylsilane and 171 parts of 2-vinyloxyoctylamine is heated at 120° C. for 50 minutes at the end of which time 70 parts of diethylamine is distilled. The oily residue has the composition of 2-vinyloxyoctylaminotributylsilane.

Example 7

The procedure of Example 6 is repeated substituting 1,1,5-trimethyl-7-vinyloxy-heptylamine for the 2-vinyloxyoctylamine and diethylaminotrimethylsilane for the silane thereof. The product is an oil having the composition of $(CH_3)_3SiNHC(CH_3)_2(CH_2)_3CH$
$(CH_3)CH_2CH_2OCH=CH_2$

Example 8

The liquid product of Example 1 (20 parts) is mixed with 8 parts of diethyl azodiisobutyrate and the mixture is heated in an oven at 74° C. for 26 hours. The volatile components are then distilled by heating on a steam bath at 0.5 mm. Hg, leaving a viscous, orange polymer. It serves as a synthetic lubricating grease which retains its lubricating effect even at low temperatures of −20° C.

Example 9

Six parts of the liquid product of Example 1 and 14 parts of methyl methacrylate are mixed with 2 parts of diethyl azodiisobutyrate. The mixture is heated 26 hours at 74° C. The solid polymer is extracted with cold ethanol and the ethanol extract is separated from methyl methacrylate homopolymer. Films cast from the ethanol extract are flexible and tough even at low temperatures of −20° C. and below.

It is to be understood that changes and variations may be made without departing from the spirit and scope of the invention as defined in the appended claims.

We claim:

1. A composition comprising a compound having the formula

I

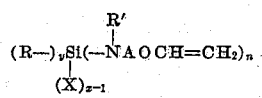

where n is a number having a value of 1 to 2, x is a number having a value of 1 to 2, y is equal to $5-x-n$, R is selected from the group consisting of alkyl and aryl groups, R' is selected from the group consisting of hydrogen and alkyl groups having 1 to 18 carbon atoms, A is selected from the group consisting of alkylene groups having 2 to 10 carbon atoms, at least two thereof extending in a chain between the adjacent nitrogen and oxygen atoms, and X is selected from the group consisting of Cl and $-NR^2R^3$ wherein $R^2$ and $R^3$ are each selected individually from the group consisting of hydrogen and alkyl groups such that the total of carbon atoms in $R^2$ and $R^3$ is from zero to 4.

2. A composition comprising a compound having the formula $$(R)_3SiN(R')AOCH=CH_2$$

where R is an alkyl group having 1 to 4 carbon atoms, R' is an alkyl group having 1 to 18 carbon atoms, and A is an alkylene group having 2 to 10 carbon atoms, at least two thereof extending in a chain between the adjacent nitrogen and oxygen atoms.

3. A composition comprising a compound having the formula $$(R)_3SiNHAOCH=CH_2$$

where R is an alkyl group having 1 to 4 carbon atoms, and A is an alkylene group having 2 to 10 carbon atoms, at least two thereof extending in a chain between the adjacent nitrogen and oxygen atoms.

4. A composition comprising a compound having the formula $$(R)_3SiN(R')AOCH=CH_2$$

where R is phenyl, R' is an alkyl group having 1 to 18 carbons atoms, and A is an alkylene group having 2 to 10 carbon atoms, at least two thereof extending in a chain between the adjacent nitrogen and oxygen atoms.

5. A composition comprising a compound having the formula $$(R)_3SiNHAOCH=CH_2$$

where R is phenyl, and A is an alkylene group having 2 to 10 carbon atoms, at least two thereof extending in a chain between the adjacent nitrogen and oxygen atoms.

6. A method comprising reacting a compound having the formula III with a compound having the formula IV in the presence of a tertiary amine, the formulas being

III    $CH_2=CHOANHR'$

IV    $(R)_ySi(Cl)_{4-y}$ where A is an alkylene group having 2 to 10 carbon atoms, at least two thereof extending in a chain between the adjacent nitrogen and oxygen atoms, R is selected from the group consisting of alkyl and aryl groups, R' is selected from the group consisting of hydrogen and alkyl groups having 1 to 18 carbon atoms, and $y$ has a value of 1 to 3.

7. A method as defined in claim 6 in which the reaction is carried out in the presence of triethylamine at a temperature of about −20° C. to about room temperature.

8. A method comprising mixing a compound of Formula III with a compound of Formula V and heating the mixture to react the compounds while distilling off an amine of the formula $NHR^2R^3$, the Formulas III and V being III $\qquad CH_2=CHOANHR'$ V $\qquad (R)_y Si(-NR^2R^3)_{4-y}$ where A is an alkylene group having 2 to 10 carbon atoms, at least two thereof extending in a chain between the adjacent nitrogen and oxygen atoms, R is selected from the group consisting of alkyl and aryl groups, R' is selected from the group consisting of hydrogen and alkyl groups having 1 to 18 carbon atoms, $R^2$ and $R^3$ are each selected individually from the group consisting of hydrogen and alkyl groups such that the total of carbon atoms in $R^2$ and $R^3$ is from zero to 4, and $y$ has a value of 1 to 3.

9. As a new compound, N-trimethylsilyl-N-methyl-2-aminoethyl vinyl ether.

10. As a new compound, N-trimethylsilyl-2-aminoethyl vinyl ether.

11. As a new compound, N-trimethylsilyl-2-aminoisobutyl vinyl ether.

12. As a new compound, diphenylchlorosilyl-2-aminoisobutyl vinyl ether.

13. As a new compound, $(CH_3)_3SiNHC(CH_3)_2(CH_2)_3CH(CH_3)$
$\qquad\qquad\qquad\qquad\qquad CH_2CH_2OCH=CH_2$ 14. A composition comprising an addition polymer of N-trimethylsilyl-N-methyl-2-aminoethyl vinyl ether.

15. A composition comprising an addition copolymer of N-trimethylsilyl-N-methyl-2-aminoethyl vinyl ether with a copolymerizable ethylenically unsaturated compound.

16. A composition comprising an addition copolymer of methyl methacrylate with N-trimethylsilyl-N-methyl-2-aminoethyl vinyl ether.

17. A composition comprising an addition polymer of diphenylchlorosilyl-2-aminosobutyl vinyl ether.

References Cited in the file of this patent
UNITED STATES PATENTS
2,676,163     Speier _____ Apr. 20, 1954

OTHER REFERENCES
Butler et al.: J. Amer. Chem. Soc., vol. 74, April 1952, pages 1939–1941.